July 31, 1945.  M. G. GOETZE  2,380,747
MACHINE TOOL
Filed March 13, 1942   4 Sheets-Sheet 4
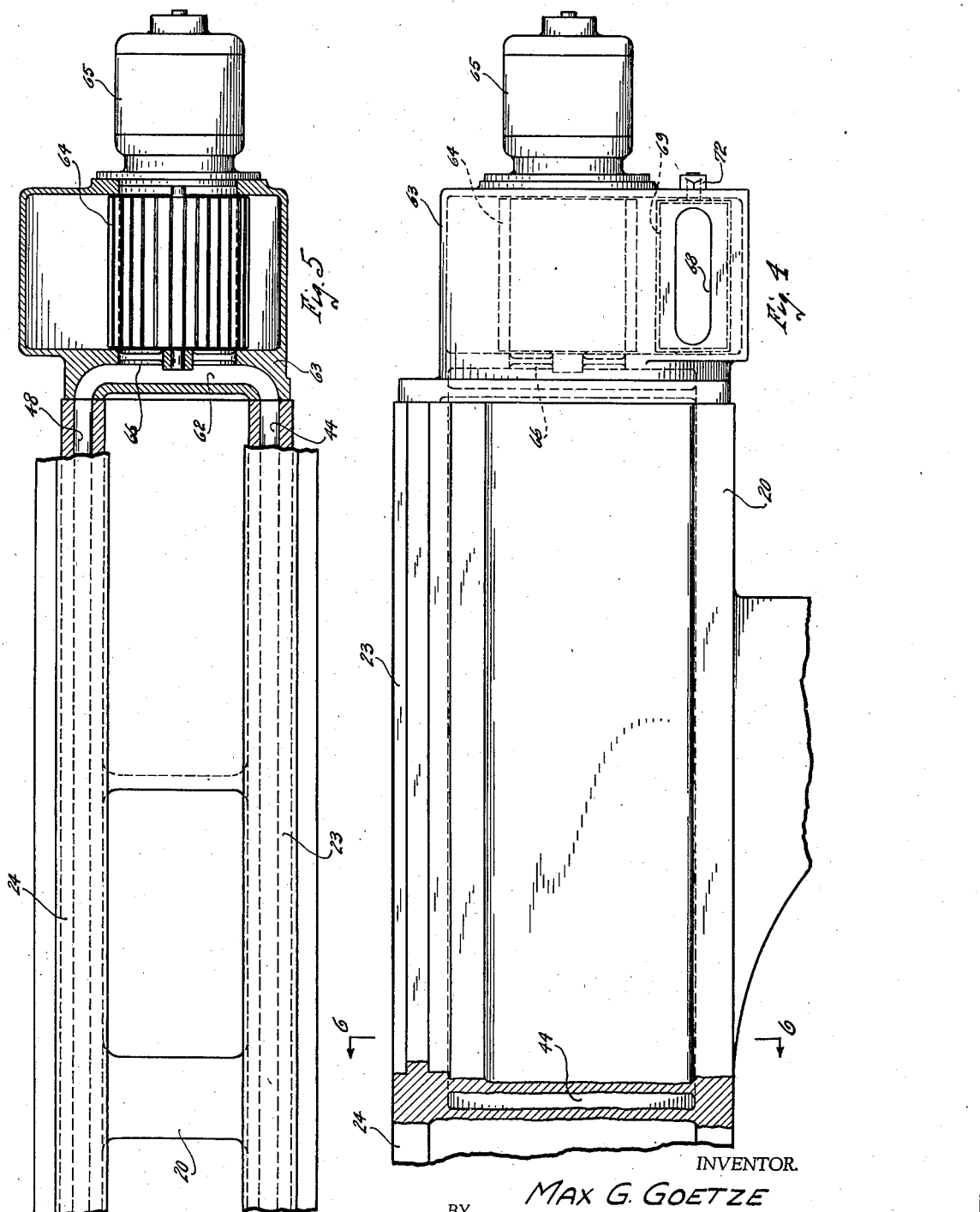
INVENTOR.
MAX G. GOETZE
BY
Kwis Hudson & Kent
ATTORNEYS Patented July 31, 1945

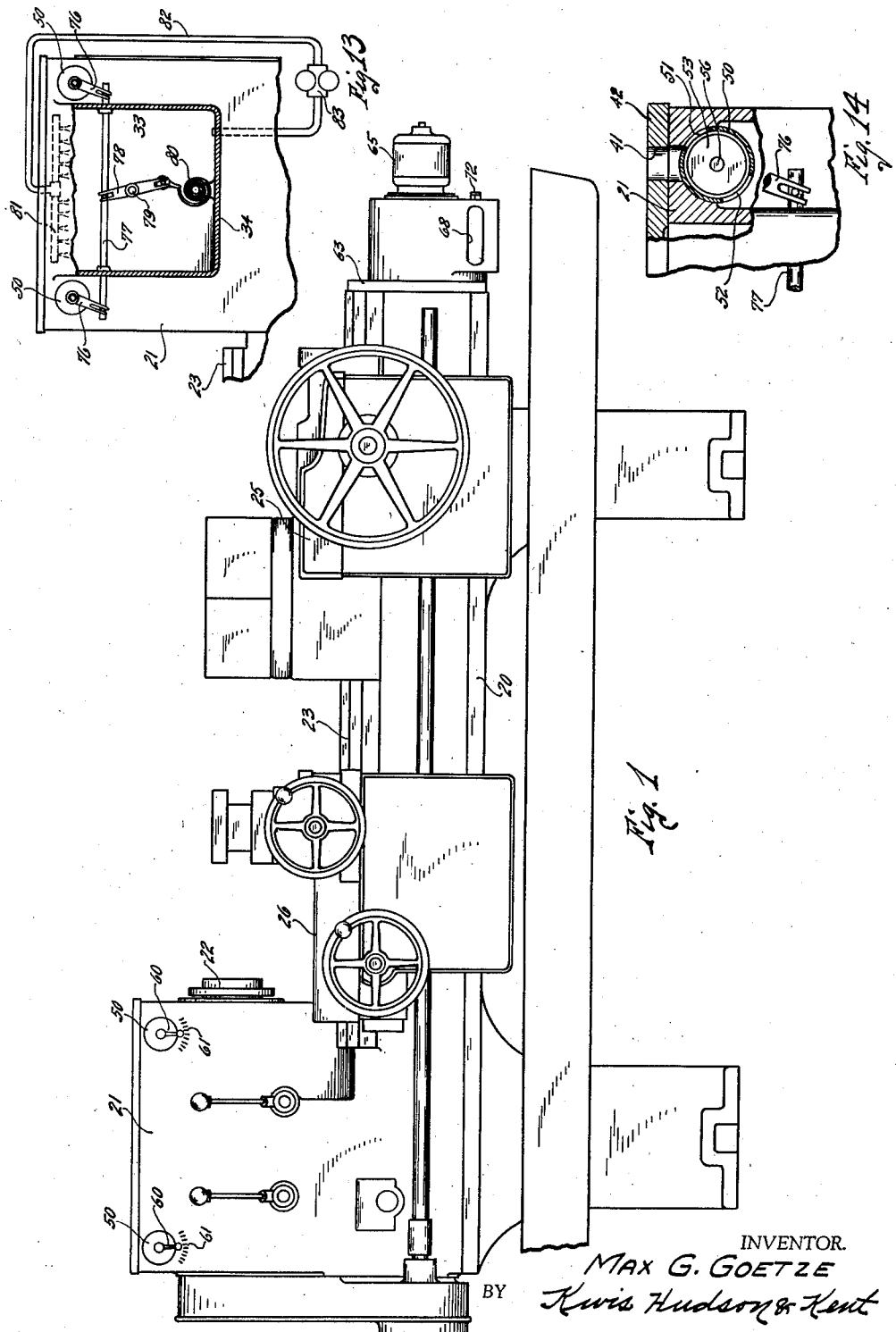

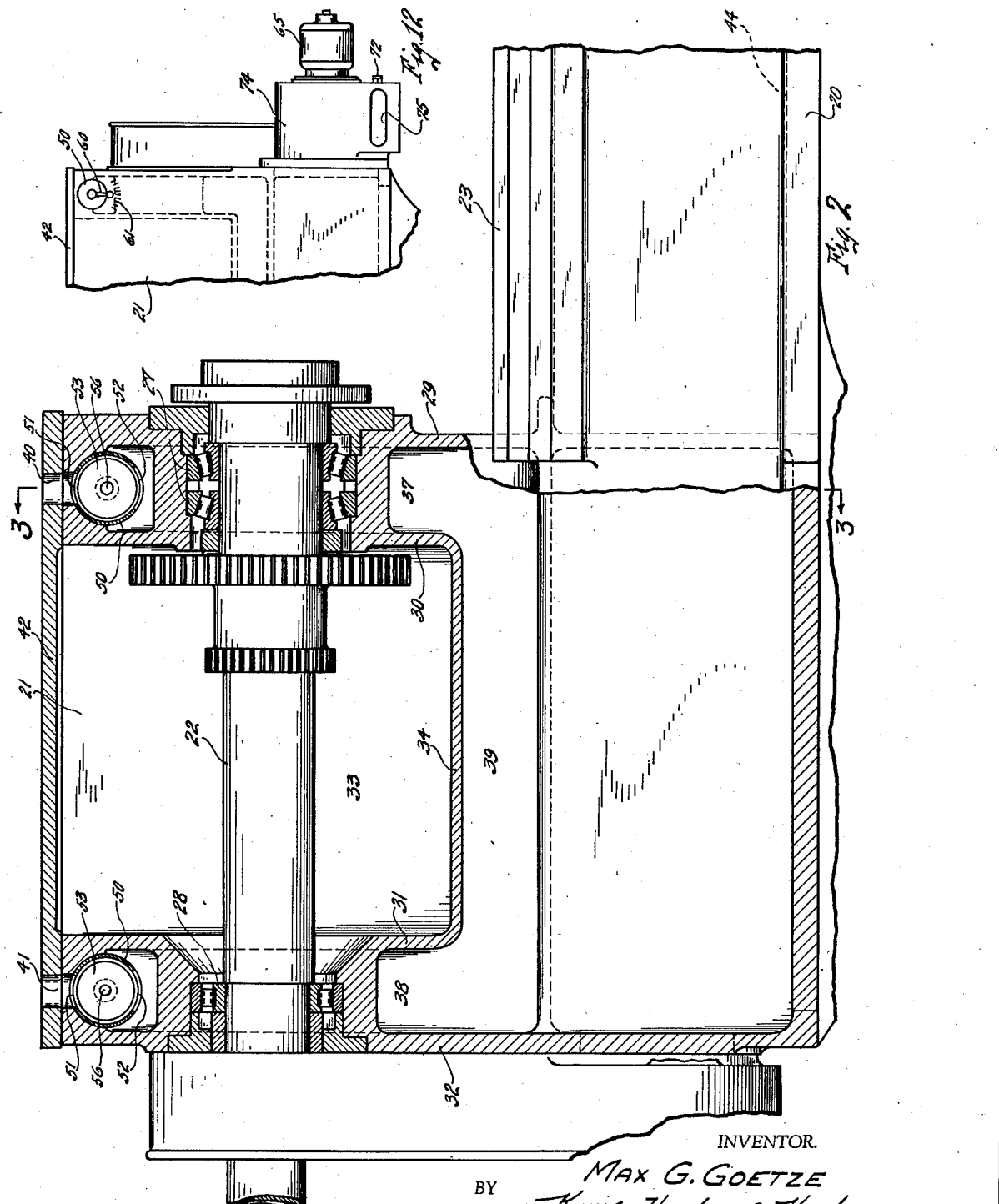

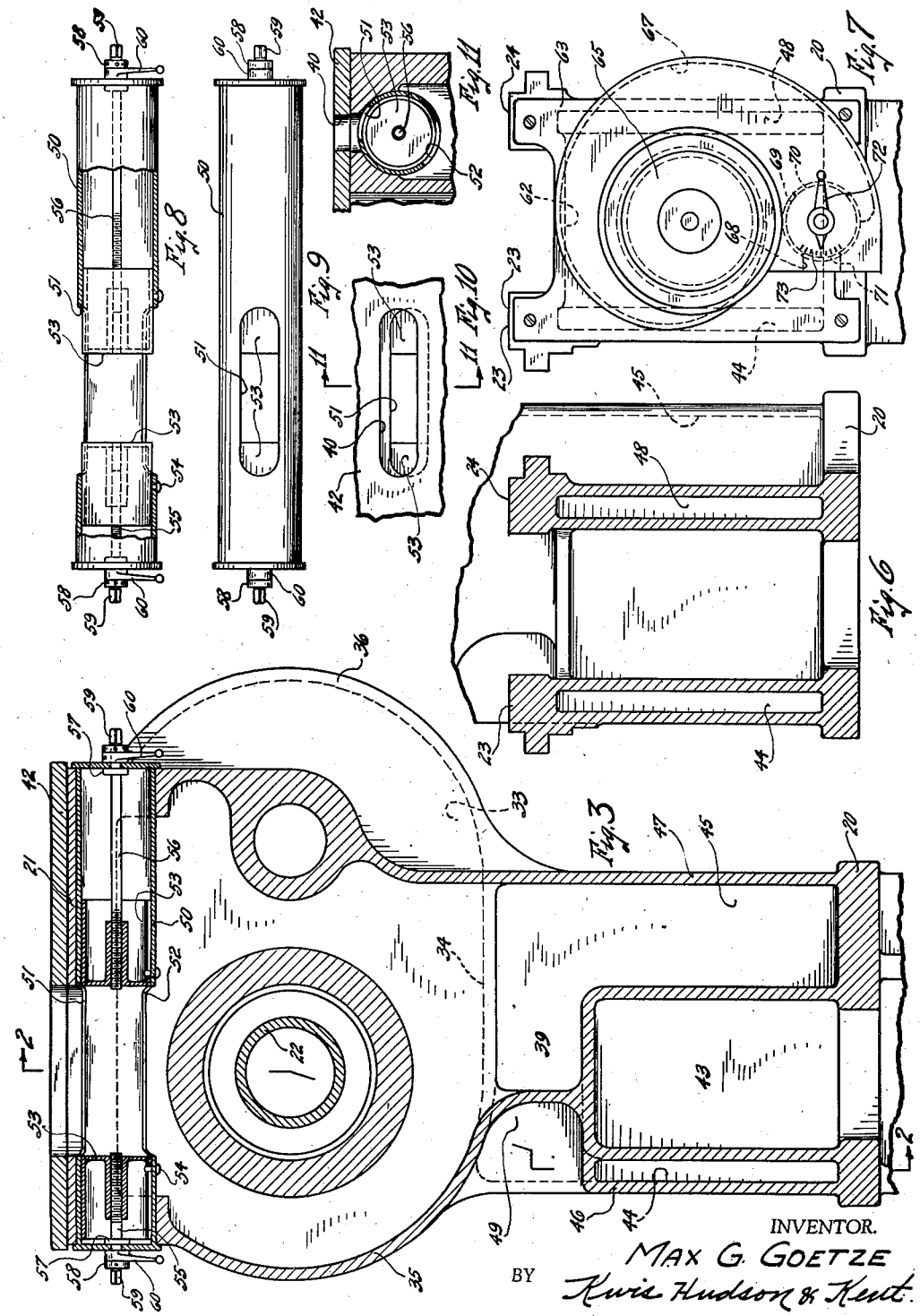

2,380,747

UNITED STATES PATENT OFFICE 2,380,747

MACHINE TOOL

Max G. Goetze, East Cleveland, Ohio, assignor to The Warner & Swasey Company, Cleveland, Ohio, a corporation of Ohio Application March 13, 1942, Serial No. 434,519

26 Claims. (Cl. 82—32)

This invention relates to a machine tool and particularly to a system for controlling the temperatures of certain parts of the machine tool which are subject to temperature variations during the operation of the machine tool.

In the operation of machine tools certain of the operative parts are subject to temperature changes due to heat being generated therein because of friction, thrust relationship or other causes while other parts remain at substantially lower temperatures. The result will be expansion in the heated parts of the machine tool, thereby distorting and altering the relationship of such parts with respect to other parts of the machine tool. The condition just outlined tends to destroy the accuracy of the work produced by the machine tool, thereby lowering the efficiency of the latter.

The principal object of the invention is to provide in a machine tool means for controlling the temperatures of various parts of the machine tool in order to equalize the temperatures of the parts throughout the machine tool as a whole and thus prevent distortion of their normal relationship therein and function of the parts thereof.

A further object is to provide in a machine tool means for maintaining a substantially uniform temperature throughout the various parts thereof whereby the rotating and sliding parts of the machine will function properly and in their correct predetermined relationship during the operation of the machine tool.

Another object is to provide in a machine tool of the type having a bed provided with ways, means for controlling the temperature of the bed and ways so as to prevent warping or distortion of the ways due to heating of localized portions thereof.

Another object is to provide in a machine tool means for controlling the temperature of the various parts thereof and which means is automatically regulated in relation to temperature variations in the lubricant that is used for lubricating and cooling the bearings and gearing of the machine tool.

Further and additional objects and advantages will become apparent or will be pointed out during the detailed description which is to follow of several embodiments of the invention. Referring to the accompanying drawings, Fig. 1 is a front elevational view of a machine tool embodying the invention and which, in this instance, is illustrated as a turret lathe.

Fig. 2 is a fragmentary view of the machine tool shown in Fig. 1, partly in section and partly in elevation, with the section taken on irregular line 2—2 of Fig. 3 looking in the direction of the arrows.

Fig. 3 is a transverse sectional view taken substantially on line 3—3 of Fig. 2 looking in the direction of the arrows.

Fig. 4 is a front elevational view of a portion of the bed of the machine tool shown in Fig. 1 and constitutes a continuation of that portion of the bed shown in Fig. 2.

Fig. 5 is a top plan view of the portion of the bed illustrated in Fig. 4 with certain parts broken away and shown in section.

Fig. 6 is a sectional view of the bed taken on line 6—6 of Fig. 4 looking in the direction of the arrows.

Fig. 7 is a right hand end elevational view of the bed shown in Fig. 4.

Fig. 8 is a detached view, partly in section and partly in elevation, of the fluid flow control device showing the parts thereof in a different relationship than the same parts are shown in Fig. 3.

Fig. 9 is a plan view of the device shown in Fig. 8.

Fig. 10 is a fragmentary top plan view of the cover plate of the headstock and shows a portion of the control device of Fig. 9 but adjusted to a different relationship between its elements.

Fig. 11 is a fragmentary sectional view taken substantially on line 11—11 of Fig. 10 looking in the direction of the arrows.

Fig. 12 is a fragmentary rear elevational view of a portion of the headstock and illustrates a modified form of the invention from that shown in the previous views.

Fig. 13 is a fragmentary rear view of the headstock, partly in section and partly in elevation, and which embodies automatic means controlled by the temperature of the lubricant for regulating in turn the fluid flow device, and Fig. 14 is a fragmentary detached view of a portion of Fig. 13 on a larger scale and with part of the headstock broken away.

The invention contemplates the provision of means in a machine tool for controlling the temperatures of various parts of the machine which are subject to temperature variations during operation to thereby maintain a substantially uniform temperature throughout the machine as a whole. It is proposed to control the temperatures not only of the bearings for rotating parts but also to control the temperatures of the supports for other movable parts of the machine tool such as the temperatures for the bed and the ways for the slides of the machine tool.

In addition it is within the contemplation of the present invention to control the temperature of the lubricant employed for lubricating and cooling bearings and other supports for movable parts of the machine tool.

The employment at the present time of high grade or improved cutting tools in machine tools has resulted in increased work spindle speeds and greater cutting pressure, consequently greatly increasing the heat developed by the various operative parts of the machine during its operation. The use of the improved cutting tools also results in greater thrust between the tools and the work, with a consequent increase in the heat developed in the bearings and the other supports for the operative parts of the machine tool.

The continuous operation of machine tools under the above mentioned conditions is apt to bring about heating of localized portions of the machine and which causes said portions to expand thereby creating distortion of the normal relationship between the various parts of the machine.

The present invention contemplates the maintenance of substantially a uniform temperature throughout the entire machine tool during its operation, thus eliminating distortion of the relationship of the parts of the machine due to localized increases in temperature in various parts thereof.

In the accompanying drawings the invention is illustrated as applied to a turret lathe, but it will be understood that the invention is applicable to various other types or forms of machine tools wherein there are moving parts.

Referring to Fig. 1, the bed of a turret lathe is indicated at 20. At one end of the bed is the headstock 21 which rotatably supports a work spindle 22. The bed 20 is provided with longitudinally extending front and rear ways 23 and 24 which are parallel to each other and to the work spindle 22. A turret slide 25 is slidably supported by the ways 23 and 24 as is also a cross slide carriage 26. The work spindle 22 is rotatably supported in the headstock by a front bearing 27 which is a combined thrust and radial bearing and by a rear radial bearing 28. The bearings 27 and 28 are carried, respectively, by spaced walls 29, 30 and 31, 32 at each end of the headstock.

The headstock contains a lubricating reservoir 33 located between the walls 30 and 31 and having a bottom wall 34. The reservoir also is defined by the wall 35 at the front side of the headstock and the wall 36 at the rear side thereof.

It will be understood that the usual gearing (not shown) which is operatively connected to the gearing on the work spindle 22 is located in the reservoir 33. The spaces in the headstock between the spaced walls 29, 30 and 31, 32 and beneath the bottom wall 34 of the reservoir are in communication with each other and constitute fluid passageways surrounding the bearings for the work spindle and the lower portion of the lubricant reservoir. These passageways are indicated in the drawings at 37, 38 and 39.

The upper ends of the passageways 37 and 38 are in communication with openings 40 and 41, respectively, formed in the headstock and in the cover plate 42 thereof and located substantially above the spindle and in the vertical line perpendicular thereto. The passageways 37 and 38 extend downwardly below and in communication with the passageway 39 and straddle the cored opening 43 beneath the headstock and communicate with longitudinally extending passageways 44 and 45 formed, respectively, between the lower front wall 46 and the rear wall 47 of the bed and intermediate walls defining the cored opening. It will be noted that the junctions of the passageways 37 and 38 with the passageway 39 are substantially in vertical alignment with the openings 40 and 41. In other words, the passageways 39, 44 and 45 constitute an inverted U-shaped passageway extending longitudinally of the head and communicating with the passageways 37 and 38 that surround the bearings 27 and 28 of the work spindle.

It will be observed that the passageways 37 and 38 encircle the bearings and the inlet openings 40 and 41 to said passageways are vertically directly above the outlets from said passageways. Therefore, fluid entering the inlet openings will divide and flow downwardly around and against each semi-circular side portion of each bearing and then will unite below the bearings and flow downwardly out of the passageways 37 and 38 into the passageway 39 which is located directly vertically below the inlet openings 40 and 41. This arrangement causes an effective flow of fluid over the entire surface of each semi-circular portion of each bearing and, as later will be described, the linear shifting of the intake openings of the valves that are associated with the inlet openings 40 and 41 enables one semi-circular portion or the other of each bearing to receive a greater or lesser volume of fluid as desired to control the temperature of the bearings.

The cored portion 43 beneath the head is extended through the bed beneath the ways 23 and 24, while the front passageway 44 continues longitudinally of the bed and the rear wide passageway 45 narrows into a rear passage 48 also extending longitudinally of the bed beneath the rear way 24, see Figs. 3 and 6.

The front wall of the headstock adjacent the right hand end thereof, as viewed in Fig. 1, is shaped inwardly to provide a recess or pocket 49 to accommodate the left hand end of the cross slide carriage when the latter is in an extreme left hand position.

The headstock intermediate the walls 29 and 30 and 31 and 32 is provided with valve means extending through the headstock from front to rear for controlling the volume of fluid or air flowing through the openings 40 and 41 and into the passageways 37 and 38. In the present instance the valve means referred to are in the form of tubular members 50, rockably supported in openings formed in the front and rear walls of the headstock but held against endwise movement by their flanged end plates. The members 50 are provided with diametrically opposed longitudinally extending slotted openings with the upper opening 51 being substantially equal in area to the openings 40 and 41, while the lower opening 52 is of greater area.

It will be seen that when the tubular members 50 are angularly adjusted the openings 51 can be positioned either in full registry with the openings 40 and 41 or partially out of registry therewith to vary the amount of fluid or air which may flow through the openings and through the valve members 50. In Figs. 10 and 11 one of the members 50 is shown therein and this member has been angularly adjusted to a position wherein the opening 51 is partially out of registry with the opening 40.

In each valve member 50 at the opposite ends of the slotted openings 51 and 52 are similar cup-like members 53 which are held against rotation relative to the member 50 by pins 54 carried by the member and extending into elongated slots formed in the cup-like members 53, wherefore the latter can be slidably adjusted internally of the member 50. Each cup-like member 53 is provided internally and centrally with a boss having a threaded bore into which extends a screw rod. The screw rod 55 adjacent the front of the headstock is associated with one of the cup-like members 53 while the longer screw rod 56 adjacent the rear of the headstock is associated with the other cup-like member. The rods 55 and 56 are each provided with a shoulder 57 engaging the inner sides of the end plates of the member 50 and through which plates said rods rotatably extend. The rods 55 and 56 outwardly of the end plates of the member 50 have fixed thereto collars 58 and outwardly of the latter are formed with polygonal end wrench portions 59. Intermediate the collars 58 and the end plates of the member 50 handles 60 are interconnected with the end plates, wherefore rocking of the handles angularly adjusts the member 50.

The front and rear walls of the headstock are provided with graduations 61 with which the handles 60 of each member 50 cooperate to visually indicate the adjusted positions of the members 50 and the alignment relationship of the openings 51 with the openings 40 and 41. In other words, the degree of the restriction offered by the members 50 to the ingress of fluid or air to the passageways 37 and 38 is visually indicated for each opening 40 or 41 and at both the front and rear of the headstock.

Referring to Figs. 4 and 5, it will be noted that the passageways 44 and 48 extend the full longitudinal length of the bed beneath the ways 23 and 24 and at the end of the bed are interconnected by a cross passageway 62 formed in a support 63 secured to the end of the bed. The support 63 rotatably mounts a suction fan 64 driven by a variable speed electric motor or other suitable means 65 carried by the support 63. The connecting passageway 62 is in communication with a centrally located opening 66 in the support 63 and which opening is coaxial with the fan 64. It will be seen that the suction fan 64 draws fluid or air from the passageway 62 through the opening 66 and expels the same radially outwardly from the fan into an outlet passage 67 formed in the support 63 and surrounding the fan 64 and illustrated in the drawings as of usual spiral formation. The exit end of the outlet passage 67 communicates with an elongated opening or slot 68 formed in the support 63. The effective area of this outlet opening or slot can be varied by means of an angularly adjustable valve regulator member 69 similar to the valve regulator members 50 carried by the headstock. The member 69 extends longitudinally of the support 63 and, as stated, is angularly adjustable in suitable bearings formed in the support but is held against endwise movement therein by its flanged end plates. The member 69 is provided with a slotted opening 70 communicating with the outlet passage 67 and diametrically therefrom with a similar slotted opening 71 substantially of the same area as the opening or slot 68 in the support 63. The member 69 has secured to it a handle 72 for effecting the angular adjustment of the member and for moving the opening 71 into full registration with the opening or slot 68 or into partial registration therewith to restrict the effective outlet area of the opening 68. The end of the support is provided with graduations 73 with which a pointer formed on the handle 72 cooperates to indicate the position of angular adjustment of the member 69 and, in turn, the degree to which the opening or slot 68 has been restricted.

It will be understood that suitable means may be provided for holding the valve members 50 and 69 in their various adjusted positions but since such means are well known in the art they have not been illustrated herein.

It will be seen that the arrangement just described can be used effectively to control the temperatures of the various parts of the machine tool and to maintain a substantially uniform and predetermined temperature of the parts throughout the machine.

As previously explained, it is desirable that the temperature of the various parts of a machine tool be maintained substantially uniform throughout the machine, so as to prevent distortion or misalignment of certain parts with respect to other parts.

In the arrangement just described it will be seen that provision is made for independent control of the volume of fluid or air flowing through the passageways 37 and 38 and around each semi-circular portion of the front bearing 27 and the rear bearing 28 of the work spindle. It will also be noted that the volume of fluid or air flowing through the headstock and the bed of the machine can be controlled by the adjustment of the member 69 at the outlet end of the passages. The multiple adjustments or controls thus provided enable the operator to meet the different temperature conditions occurring in various parts of the machine and to be able to maintain a substantially uniform temperature throughout the machine tool and especially in the various parts thereof in which heat is generated.

It will be understood that the fluid or air drawn into the passages through the openings 40 and 41 may be at room temperature or, if desired, it may be at a higher or a lower temperature, depending upon the conditions present and which it is desired to control. It will be understood that fluid or air at a higher or a lower temperature than room temperature may be introduced into the openings 40 and 41 through suitable conduits, not shown, and which are connected with a suitable supply source.

The operator makes the regulatory adjustments of the volume of incoming fluid or air and the volume of outflowing fluid or air in accordance with experience gained from the operation of the machine, the sizing or guaging of the work produced thereby and other conditions known by him, such as which bearings have a tendency to produce greater heat than other bearings as, for instance, a bearing carrying both radial and end thrust as distinguished from a bearing carrying only radial thrust. In addition the operator may know that a certain bearing has been more tightly adjusted than another bearing and will generate greater heat than the other bearing until it has become properly run in.

In addition to the factors above enumerated the operator will consider the spindle speeds, the type of cuts of the various tools and the thrust relationships created between the tools and work in determining the best adjustments to be made to obtain a substantially uniform temperature in the various parts throughout the machine, it being understood that the flow of fluid or air through the passages will act in some instances to cool certain parts of the machine while in other instances it will act to increase the temperature of other parts thereof, since the fluid or air passing around the spindle bearings to cool the same will have its temperature increased before flowing beneath the lubricant chamber and through the passages in the bed and will act to cool the lubricant chamber and certain parts of the bed if such parts are of high temperature and to increase the temperature of other parts which may be of relatively low temperature. In other words, the fluid or air acts to bring the temperature of the various parts of the machine into substantial uniformity with each other throughout the machine, reducing the temperature of those parts which are high and raising the temperature of those parts which are low.

It will be understood that the lubricant in the lubricant chamber and which continuously flows around and through the bearings and over the gearing to lubricate and cool the same is, in turn, cooled by the flow of fluid or air around the lower portion of the lubricant chamber, thus enabling the lubricant to perform effectively its function.

In making the adjustments to control the temperatures of the various parts of the machine tool and to maintain a substantially uniform temperature throughout the machine the operator necessarily considers the factors above referred to. He may first adjust the cup-like members 53 in the members 50 by turning the screw rods 55 and 56. The adjustment of the cup-like members 53 will be for the purpose of controlling the ingress of the fluid or air so as to cause it to flow in greater volume around one or the other of the semi-circular portions of the front or rear bearings than around other parts thereof. In other words, the adjustable inlet openings can be controlled as to size and also can be shifted in a horizontal plane toward the front or rear of the headstock to more effectively control the temperature of the front or the rear semi-circular portion of each of the bearings. The adjustment of the members 53 is determined by the nature of the cuts being taken on the work piece and the portion of the bearings subjected to the greatest thrust developed by the reaction of the work piece to the cutting tools. In addition to this adjustment the operator adjusts the members 50 individually depending upon which bearing develops the greater heat. In the present illustration the member 50 beneath the opening 40 would probably be adjusted to permit a larger volume of fluid or air through than would the member 50 beneath the opening 41, since the front bearing 27 takes both radial and end thrust while the rear bearing 28 takes only radial thrust. In some cases a large overhanging chuck or other type of work holder may be secured to the spindle nose and the weight of this overhanging member together with the work piece therein would increase the radial thrust on the bearings with a consequent increase in the tendency to develop heat therein and such circumstance would also be a factor to consider in adjusting the members 50. The operator also adjusts the member 69 to control the volume of fluid or air passing through the outlet opening 71. If the motor 65 is a variable speed motor he may also adjust its speed to obtain a certain flow velocity and volume of the fluid or air passing through the passages. After these adjustments have been made and the machine is operating in the performance of work, the operator by observing or testing the condition of the various parts of the machine tool and by sizing or gauging the work piece machined thereon may find it necessary to alter the adjustments from time to time, in which event he makes the necessary corrections.

It may be that in small sized machines performing only light work or for other reasons it is not necessary to extend the passages through the bed beneath the ways. In such circumstances it may be entirely satisfactory to mount a fan and motor outlet support 74 directly on the end of the headstock with the interior of the support in communication with the passages in the headstock. This arrangement is illustrated in Fig. 12, and it will be understood that the support 74 is provided with an outlet opening 75, the effective area of which can be changed by an adjustable valve member similar to the adjustable member 69 and adjusted in the same way.

It may be advantageous to control and effect the adjustment of the members 50 automatically in relationship to the temperature of the lubricant in the lubricating chamber. The advantage, of course, will be understood since the lubricant continuously flows around and through the bearings and over the gearing to cool the same, with the result that the temperature of the lubricant is proportional to the heat developed in the bearings and gearing.

In Figs. 13 and 14 an arrangement is shown for automatically controlling the adjustment of the members 50 in this manner. In place of the handles 60 at the front and rear of the headstock the members 50 have their rear ends operatively connected to lever arms 76 which are slotted at their free ends and straddle pins carried by a rod 77 slidably supported by the walls of the lubricant chamber. The rod 77 intermediate its ends and interiorly of the lubricant chamber is provided with a pin which is straddled by the slotted free end of a lever 78 that is pivotally supported intermediate its ends on a bearing 79 located within the lubricant chamber and supported by the walls thereof. The lower end of the lever 78 is operatively connected with a thermostatic device 80 which may be in the form of bi-metallic elements and which is supported on the bottom wall 34 of the lubricant chamber and within the latter so as to be submerged in the lubricant at all times. In the arrangement shown in Figs. 13 and 14 the cup-like members 53 may be manually adjusted as previously described to individually vary the effective area of the openings 40 and 41 and the effective portions of said openings as heretofore explained, to thus control separately the volume and location of the fluid or air flowing around the bearings 27 and 28. The angular adjustment of the members 50, however, is not manually and individually obtained in the modified arrangement since the members 50 are adjusted in unison automatically by the shifting of the rod 77, due to the rocking of the lever 78 by the thermostatic device 80 as temperature variations occur in the lubricant in which said device is submerged. In other words, the adjustment of the members 50 and the volume of incoming fluid or air controlled by such adjustment is automatically obtained in relation to the temperature of the lubricant in the lubricating chamber which, as has been stated before, is proportional to the heat developed in the bearings and gearing which, in turn, controls the heat of the machine tool as a whole.

It will be noted that the lubricant is sprayed or cascaded from an overhead outlet fitting 81 connected by a pipe 82 with a pump 83 which, in turn, is connected to the bottom of the reservoir.

The lubricant therefore flows over and around the shafting, gearing and bearings during the operation of the machine.

The description hereinbefore given has stated that the fluid is introduced into the passageways at the top of the headstock and drawn through said passageways by the fans. However, it should be appreciated that the fluid might also be circulated through the passageways in the reverse direction as, for example, by reversing the direction of rotation of the circulating fans. The reverse circulation of the fluid through the passageways might be advantageous under certain conditions and would serve to accomplish the objects sought, namely, the maintenance of the temperatures of the various parts of the machine substantially uniform with respect to each other and either at room temperature or different than room temperature. In this connection it will be recalled that different degrees of heat are developed in various parts of the machine under specific conditions and different machining operations and the reversing of the direction of flow of the fluid through the passageways also will enable the control of the temperature of the machine as a whole in many of these instances.

Although several preferred embodiments of the invention have been illustrated and described herein, it will be understood that the invention is susceptible of various modifications and changes within the scope of the appended claims.

Having thus described my invention, I claim:

1. In a machine tool, a movable part, a bearing for said part, walls defining a passageway substantially surrounding said bearing, fluid inlet means to said passageway, fluid outlet means from said passageway arranged substantially in diametrically opposed alignment with said inlet means, and adjustable valve means operatively associated with said inlet means for regulating the effective inlet area thereof and for shifting the location of the same to control the volume and location of fluid entering said passageway, said valve means including cooperating members having relative rotating and linear movements with respect to each other.

2. In a machine tool, a movable part, a bearing for said part, walls defining a passageway substantially surrounding said bearing, fluid inlet means to said passageway, and means associated with said inlet means for controlling the volume of fluid entering said passageway and including a member adjustable to vary the effective inlet area of said inlet means and having openings therein, and means for varying the effective location and area of said openings.

3. In a machine tool, a movable part, a bearing for said part, walls defining a passageway substantially surrounding said bearing, fluid inlet means to said passageway, and means associated with said inlet means for controlling the volume of fluid entering said passageway and including a cylindrical member having a peripheral opening, and means associated with said member for varying the effective location and area of said opening.

4. In a machine tool, a movable part, a bearing for said part, walls defining a passageway substantially surrounding said bearing, fluid inlet means to said passageway, and means associated with said inlet means for controlling the volume of fluid entering the same and including individually adjustable members for varying the effective location of said inlet area of said inlet means.

5. In a machine tool, a movable part, a bearing for said part, walls defining a passageway substantially surrounding said bearing, fluid inlet means to said passageway, and means associated with said inlet means for controlling the volume of fluid entering the same and including members for varying the location of the effective inlet area of said inlet means and which members are individually adjustable endwise.

6. In a machine tool, a movable part, a bearing for said part, walls defining a passageway surrounding said bearing, fluid inlet means to said passageway, and means operatively associated with said inlet means for controlling the volume of fluid entering said passageway and including members individually movable endwise to vary the location of the effective inlet area of said inlet means, and threaded means operatively associated with said members for moving the same.

7. In a machine tool, a movable part, a bearing for said part, walls defining a passageway surrounding said bearing, fluid inlet means to said passageway, a tubular member having an elongated opening operatively associated with said inlet means, and separate members carried by said tubular member and separately adjustable longitudinally thereof to vary the effective area of said opening and the effective location thereof in relation to said bearing.

8. In a machine tool, a movable part, a bearing for said part, walls defining a passageway substantially surrounding said bearing, fluid inlet means to said passageway, fluid outlet means from said passageway arranged substantially in diametrically opposed alignment with said inlet means, and adjustable valve means operatively associated with one of said means for regulating the effective area thereof to control the volume of fluid flowing through said passageway, said valve means including cooperating members having relative rotating and linear movements with respect to each other.

9. In a machine tool, a movable part, a plurality of spaced bearings for said part with the individual bearings being subjected to different thrust actions by said part, walls defining passageways substantially surrounding said bearings, fluid inlet means to each of said passageways, and separate means operatively associated with said inlet means for individually controlling the inlet location for and the volume of fluid entering each of said passageways, said separate means each including cooperating members having relative rotating and linear movements with respect to each other.

10. In a machine tool having a headstock, a spindle therein, a front bearing and a rear bearing for said spindle with one of said bearings subjected to different thrust action by said spindle than the other bearing, walls defining passageways substantially surrounding said bearings, fluid inlet means to each of said passageways, and separate means operatively associated with said inlet means for individually controlling the inlet location for and the volume of incoming fluid to each of said passageways, said separate means each including cooperating members having relative rotating and linear movements with respect to each other.

11. In a machine tool, a movable part, spaced bearings for said part certain of which are subject to different thrust actions by said part than are others thereof, walls defining fluid passageways surrounding said bearings, separate tubular members operatively associated with said passageways and each having an elongated opening therein, and separate members carried by said tubular members and separately adjustable longitudinally thereof to vary the effective area of each of said openings and the effective location of said openings in relation to each of said bearings.

12. In a machine tool, a support having walls, a movable part carried by said support, spaced bearings for said part, the walls of said support defining interconnected passageways surrounding said bearings, certain of said walls defining a lubricant chamber, said support having fluid inlet openings to said passageways and fluid outlet openings therefrom with said inlet openings located substantially in axial alignment with said outlet openings and on diametrically opposite sides of said bearings, whereby fluid may be circulated through said openings and substantially throughout said passageways and equally around each segmental portion of said bearing.

13. In a machine tool, a headstock provided with a lubricant chamber, a spindle in said headstock, bearings for said spindle, the walls of said headstock and lubricant chamber defining passageways surrounding said bearings and another passageway interconnecting said first passageways and located below said lubricant chamber, said passageways substantially embracing said lubricant chamber, said headstock having fluid inlet openings to said passageways and fluid outlet openings from said passageways the said inlet openings located substantially in axial alignment with said outlet openings and on diametrically opposite sides of said bearings whereby fluid may be circulated through said openings and substantially throughout said passageways and equally around each segmental portion of said bearings.

14. In a machine tool, a headstock, a bed extending therefrom and provided with a way for slidably supporting a movable part, a spindle in said headstock, a bearing for said spindle, walls defining a fluid passageway substantially surrounding said bearing, said bed being formed with spaced walls defining a fluid passageway extending through the bed in proximity to said way and communicating at one end with said first named passageway and at its opposite end with an outlet from said bed, and means for circulating fluid through said headstock passageway then through said bed passageway and then through said opening outlet of said bed to control the temperature of said bearing, head, bed and way.

15. In a machine tool, a headstock, a bed having a way slidably supporting a movable part, a spindle in said headstock, bearings for said spindle, certain of which are subject to different thrust reactions by said spindle than are the others thereof, walls defining fluid passageways substantially surrounding said bearings, separate means for individually controlling the flow of fluid through said passageways, said bed having spaced walls defining a fluid passageway extending therethrough in close proximity to said way and communicating with said first named passageways, and means for circulating fluid through all of said passageways to control the temperature of said bearings, head, bed and way to prevent relative distortion therein and to maintain said spindle in proper relationship to said way.

16. In a machine tool, a headstock provided with a lubricant chamber, a bed having a way slidably supporting a movable part, a spindle in said headstock, bearings for said spindle, certain of which bearings are subject to different thrust reactions by said spindle than are the others thereof, the walls of said headstock and lubricant chamber defining fluid passageways substantially surrounding said bearings and chamber, separate means for individually controlling the flow of fluid through said passageways, said bed having spaced walls defining a fluid passageway extending therethrough in close proximity to said way and communicating with said first named passageways, and means for circulating fluid through all of said passageways to maintain the temperature of said bearings, headstock, lubricant chamber and lubricant therein, bed and way substantially uniform to prevent relative distortion therein and to maintain said spindle in proper relationship to said way.

17. In a machine tool, a headstock provided with a lubricant chamber, a bed having ways slidably supporting a movable part, a spindle in said headstock, bearings for said spindle, the walls of said headstock and lubricant chamber defining fluid passageways substantially surrounding said bearings and another passageway interconnecting said first passageways and extending beneath said lubricant chamber, said bed having spaced walls defining separate fluid passageways extending therethrough in close proximity to said ways and at one end in communication with said first named passageways, said spaced walls also defining a passageway interconnecting the opposite ends of said separate passageways in said bed and in communication with an outlet from said bed, and means associated with said last named passageway for circulating fluid through all of said headstock passageways, then said separate bed passageways, then said interconnecting bed passageway and outlet to maintain the temperature of said bearings, headstock, lubricant chamber and lubricant therein, bed and ways substantially uniform to prevent relative distortion therein and to maintain said spindle in proper relationship to said ways.

18. In a machine tool having movable parts, bearings and supports for said parts, walls defining fluid passageways substantially surrounding said bearings and separate passageways lying in close proximity to said supports and in communication at one end with the bearing surrounding passageways, a plurality of inlet means to said bearing surrounding passageways, individually adjustable valve means operatively associated with each of said inlet means to control the proportion of fluid passing therethrough, a common outlet means for the opposite end of said separate passageways, and adjustable valve means operatively associated with said outlet means for controlling the total volume of fluid flowing into and through said bearing surrounding passageways then unidirectionally through said separate passageways and said common outlet.

19. In a machine tool, a headstock provided with a lubricant chamber, a spindle in said headstock, a bearing for said spindle, the walls of said headstock and lubricant chamber defining a fluid passageway surrounding said bearing, means for controlling the volume of fluid flowing through said passageway, and means located in said lubricant chamber and controlled by the temperature of the lubricant therein for controlling said last named means.

20. In a machine tool, a headstock provided with a lubricant chamber, a spindle in said headstock, bearings for said spindle, the walls of said headstock and lubricant chamber defining passageways surrounding said bearings, adjustable valve means associated with each of said passageways to control the volume of fluid flowing therethrough, means operatively associated with said adjustable valve means and located in said lubricant chamber and controlled by the temperature of the lubricant therein for controlling said valve means, and means operatively associated with each of said valve means for varying the effective capacity of the same independently of its adjusted position.

21. In a machine tool having a headstock, a spindle therein, a bearing for said spindle, said headstock having walls defining a passageway substantially surrounding said bearing, and a fluid inlet opening to said passageway and a fluid outlet opening from said passageway with said openings located substantially in axial alignment with each other and on diametrically opposite sides of said bearing whereby fluid may be circulated through said openings and substantially throughout said passageway and equally around each semi-circular portion of said bearing.

22. In a machine tool, a support having walls, a movable part carried by said support, a bearing for said part, the walls of said support defining a passageway substantially surrounding said bearing, said support having a fluid inlet opening to said passageway and a fluid outlet opening from said passageway with said openings located substantially in axial alignment with each other and on diametrically opposite sides of said bearing whereby fluid may be circulated through said openings and substantially throughout said passageway and equally around each semi-circular portion of said bearing, and means operatively associated with said inlet opening for controlling the volume of fluid entering said passageway.

23. In a machine tool having a headstock, a spindle therein, a bearing for said spindle, said headstock having walls defining a passageway substantially surrounding said bearing and having a fluid inlet opening to said passageway and a fluid outlet opening from said passageway with said openings located substantially in axial alignment with each other and on diametrically opposite sides of said bearing whereby fluid may be circulated through said openings and substantially throughout said passageway and equally around each semi-circular portion of said bearing, and means operatively associated with said inlet opening for controlling the volume of incoming fluid.

24. In a machine tool, a support having walls, a movable part carried by said support, a plurality of spaced bearings for said part the walls of said support defining passageways substantially surrounding said bearings, said support having fluid inlet openings to said passageways and fluid outlet openings from said passageways with said inlet openings located substantially in axial alignment with said outlet openings and on diametrically opposite sides of said bearings whereby fluid may be circulated through said openings and substantially throughout said passageways and equally around each semi-circular portion of said bearings.

25. In a machine tool having a bed provided with a way for slidably supporting a movable part, said bed being formed of spaced walls defining separate fluid passageways extending through said bed and in proximity to said way, said bed also having an inlet passageway which communicates with the corresponding ends of said separate passageways, said separate passageways communicating adjacent their opposite ends with outlets, and means for circulating fluid through said inlet passageway then unidirectionally through said separate passageways and said outlets to control the temperature of said part and said way.

26. In a machine tool having a bed provided with ways slidably supporting a movable part, said bed having walls defining separate passageways extending through the bed in proximity to said ways and an inlet passageway in communication with the corresponding ends of said separate passageways and also defining a passageway interconnecting said separate passageways adjacent their opposite ends, said bed having an outlet opening communicating with said interconnecting passageway, and means operatively associated with said opening for circulating fluid through said inlet passageway, unidirectionally through said separate passageways, through said interconnecting passageway and then through said opening.

MAX G. GOETZE.